United States Patent Office 3,442,048
Patented May 6, 1969

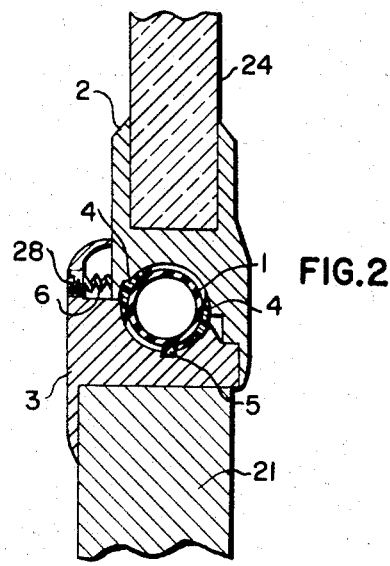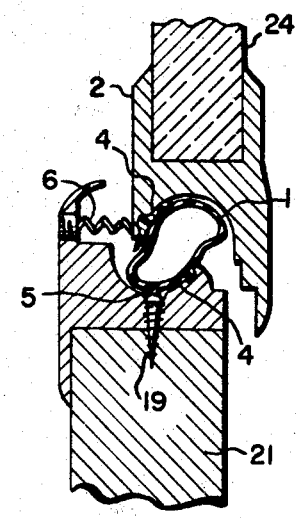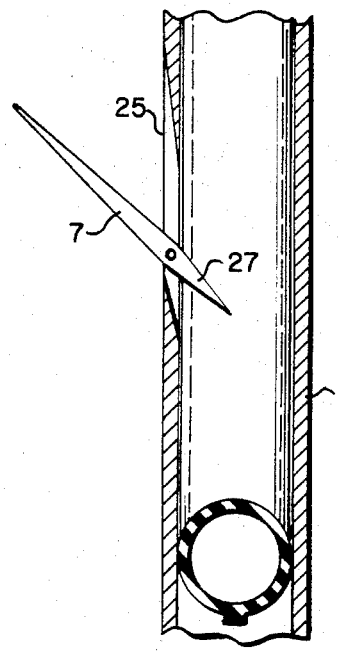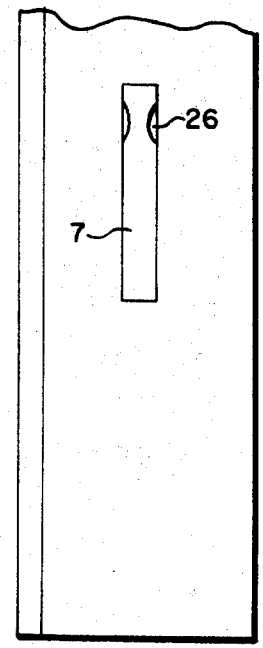

3,442,048
EJECTABLE WINDOW FOR A PASSENGER VEHICLE
Enrique Elias, No. 252 Av. Nuevo Leon,
Mexico City 11, Mexico
Filed Mar. 17, 1967, Ser. No. 624,059
Int. Cl. E05c *15/02*
U.S. Cl. 49—141          7 Claims

ABSTRACT OF THE DISCLOSURE

A window for a passenger vehicle whose pane portion is secured to the frame portion by an inflated tube of pliable material simultaneously received in respective recesses in opposite edge faces of the pane and frame portions. When the tube is deflated, the pane portion of the window is ejected by springs.

Background of the invention

Busses and similar vehicles for transportation of a substantial number of passengers must be equipped with emergency exits. It is known to use window openings as emergency exits, and the known arrangements either rely on removal of the window pane in one piece together with its metal edging, or a hammer is provided for breaking the glass pane in an emergency.

The disadvantages of the last-mentioned arrangement are obvious. It is a common shortcoming of most windows equipped to serve as emergency exits after removal of the pane together with its edging that an airtight seal between the pane and the frame is not maintained in normal use of the window, and that the pane portion of the window is in movable frictional engagement with the frame portion, thereby gradually widening the gap between the two portions, and increasing passenger discomfort due to drafts and the entry of cold or hot air from the outside into the vehicle.

The invention provides a window whose pane portion can be ejected safely and quickly in the event of an emergency but which provides a perfect seal between the window portions under all normal operating conditions.

Summary

Opposite edge faces of the frame and of a molding on the pane in the window of the invention are formed with respective recesses which jointly define a channel in the assembled condition of the window. A tubular member of pliable material is received in the channel and is normally inflated to a pressure higher than atmospheric pressure to seal the window portions and to lock them to each other.

Brief description of the drawing

The exact nature of the invention as well as other objects and advantages thereof will be readily apparent from consideration of the following specification relating to the annexed drawing in which:

FIG. 2 shows a portion of a window in the structure of FIG. 1 in section on the line II—II, and on a larger scale;

FIG. 3 shows the apparatus of FIG. 2 in a different operational position;

FIG. 4 shows another portion of the window in section on the line IV—IV in FIG. 1; and FIG. 5 shows the window portion of FIG. 4 in a view corresponding to that of FIG. 1, but on a larger scale.

Description of the preferred embodiment

Figure 1:
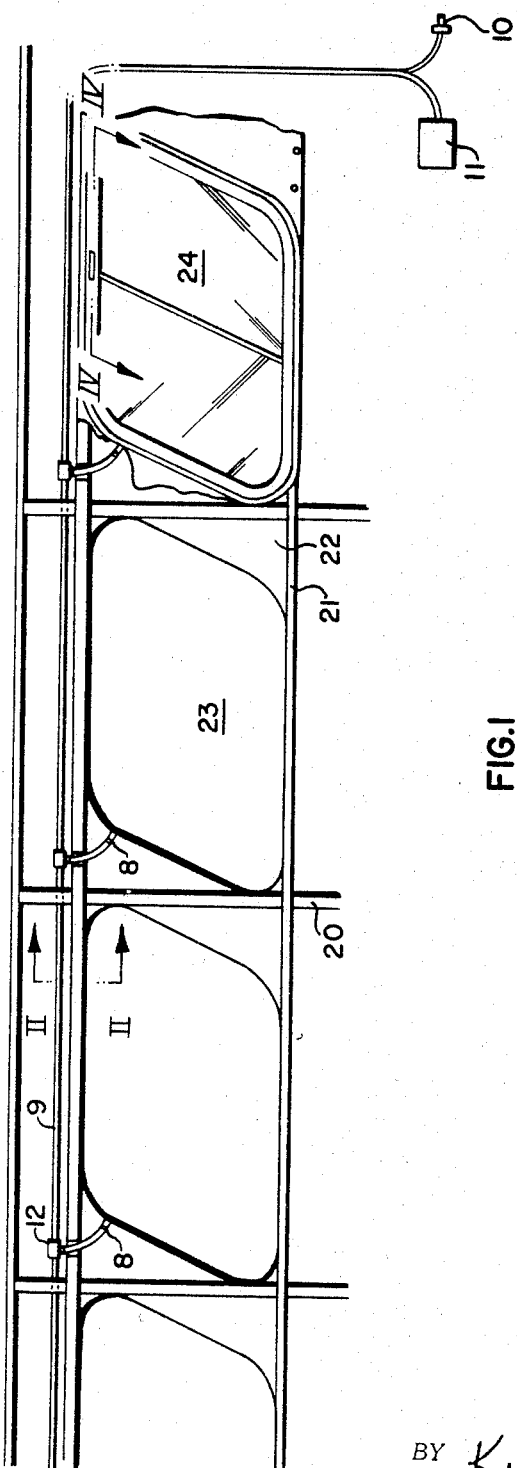
FIG. 1 shows as much of the sidewall structure of a bus as is needed for an understanding of the invention, the view being from the inside of the bus in side elevation.

FIG. 1 partly shows the side wall structure of an otherwise conventional bus. Uprights 20 and horizontal beams 21 support a sheet metal cover 22 provided with window openings 23. When the bus is fully assembled, the openings 23 are closed mainly by glass panes 24.

As is better seen in FIG. 2, each window opening is framed by a molding 3 fixedly attached to the beams 21 in the supporting wall structure by fasteners 19 (FIG. 3). The edge face of the molding 3 has a recess of approximately semi-circular cross section which extends in a closed loop about the window opening.

The window pane 24 is edged by a molding 2 which sealingly receives the pane and abuttingly engages the molding 3 in the normal assembled condition of the window shown in FIG. 2. An annular recess of approximately semi-circular cross section extends about the circumference of the molding 2, and the recesses in the two moldings jointly define a channel which receives an annular rubber tube 1.

Helical compression springs 6, of which only one is seen in the drawing, are arranged about the edge face of the molding 3 to urge the window pane 24 outwardly of the window opening. The two moldings 2, 3 are locked to each other against the force of the springs 6 by the tube 1 as long as the tube is inflated to a sufficiently high pressure.

To prevent damage to the tube 1 during installation and during ejection of a window pane 24 by the springs 6, strips 4 of a plastic more rigid than the pliable rubber of the tube 1 are fastened to the moldings 2, 3 respectively at opposite edges of their recesses, and each strip projects from the associated molding into the recess of the other molding in contact with the tube 1, thereby bridging the gaps between the moldings and preventing contact of the tube 1 with the relatively sharp edges of the moldings at the recesses. The moldings are preferably of extruded aluminum, as is conventional.

An integral longitudinal rib 5 on the tube 1 engages a corresponding groove in the molding 3 and maintains a predictable angular orientation of the tube in the channel of the moldings.

A lever 7 is normally mounted flush in a slot 25 of the horizontal top portion of the molding 2. Its longer arm has lateral notches 26 (FIG. 5) which permit the lever arm to be gripped and swung outwardly of the slot 25, as shown in FIG. 4, whereby the pointed shorter lever arm 27 swings inwardly of the recess in the molding 2 and punctures the tube 1. When the tube becomes limp by escape of air through the puncture, the springs 6 push the window out of its frame, as is shown in FIG. 3.

Reverting to FIG. 1, the air supply system for the tubes 1 is shown to include a manifold tube 9 connected to the compressed air tank 11 of the brake system, not otherwise shown. A valve 10 on the manifold may be connected temporarily or permanently to a pressure gage. A branch conduit leads from the tube 9 to a check valve 8 on each window frame. The valve is of the type commonly employed on air hoses for inflating automotive tires. It is normally closed under the pressure of the gas in the tube 9, and is opened by the insertion of a nipple fastened on the associated tube 1.

A pressure reducing valve 12, also conventional in its structure and operation, maintains the pressure in each tube 1 at a constant value below the normal minimum operating pressure in the tank 11 but higher than ambient atmospheric pressure. A restricted passage in each reducing valve 12 prevents sudden pressure loss in the manifold tube 9 when one of the rubber tubes 1 is punctured.

In assembling the illustrated windows, the frame moldings 3 are first mounted on the wall of the vehicle by means of the fasteners 19. The deflated tube 1 is placed about the molding 2 which has been pre-assembled with the window pane 24, and is connected with the valve 8 while the manifold tube 9 is at ambient pressure. The tube 1 is then slipped into the recess of the molding 3 while the pane 24 is put in position within the frame molding 3.

When all windows are installed in this manner, the tubes 1 are inflated. The springs 6 are inserted last through openings in the molding 3, and are secured by set screws 28 which plug the openings.

In an emergency, a window may be converted quickly to an emergency exit by lifting its lever 7 and thereby puncturing its tube 1, whereupon the pane 24 and its edge molding 2 are ejected from the window opening by the springs 6.

If a bus is not provided with pneumatic brakes, an inflating system for admitting and maintaining a fluid under pressure in the interior of the tubes 1 different from that illustrated will readily be devised by those skilled in the art.

It should be understood, therefore, that the foregoing disclosure relates only to a preferred embodiment of the invention, and that it is intended to cover all changes and modifications of the example of the invention herein chosen for the purpose of the disclosure which do not constitute departure from the scope and spirit of the invention set forth in the appended claims.

What is claimed is:
1. A window for a vehicle and the like comprising, in combination:
   (a) a window frame portion defining an opening therein and having an edge face directed inward of said opening;
   (b) a window pane portion adapted to be assembled with said frame portion for closing said opening,
      (1) said pane portion having an edge face opposite said edge face of the window frame portion in the assembled condition of the window,
      (2) said edge faces being formed with respective recesses therein, said recesses jointly defining a channel;
   (c) a tubular member of pliable material in said channel;
   (d) inflating means for admitting a fluid under pressure to the interior of said tubular member;
   (e) thrust means urging said window pane portion to move outward of said opening in the installed condition of the window, said tubular member locking the pane portion by simultaneous engagement with said recesses when under the pressure of a fluid admitted by said inflating means; and
   (f) deflating means for releasing said fluid from the interior of the tube
      (3) whereby the resilient means thrusts the window pane portion outwardly of the opening when the fluid pressure in the tube is deflated.
2. A window as set forth in claim 1, wherein said deflating means comprises a piercing member having a cutting portion, and actuating means for moving the cutting portion into cutting engagement with the tubular member in said channel to deflate the same.
3. A window as set forth in claim 1, wherein the thrust means comprises yieldably resilient elements.
4. A window as set forth in claim 1, wherein said channel is elongated and of substantially circular cross section.
5. A window as set forth in claim 1, further comprising a liner member mounted in fixed spatial relationship to one of said edge faces and projecting from said one edge face for insertion into the recess of the other edge face in engagement with said tubular member in the assembled condition of the window.
6. A window as set forth in claim 1, wherein said inflating means include a source of gas under pressure, and pressure reducing valve means connecting said source to said tubular member for maintaining in said member a substantially constant gas pressure higher than atmospheric pressure but lower than the pressure of the gas at said source.
7. A window as set forth in claim 1, wherein said pane portion includes a transparent window pane and a molding on said pane, said molding edging said window pane, and said tube is annular and extends about said window pane in simultaneous sealing engagement with said pane portion and with said frame portion when inflated by said inflating means.

References Cited

UNITED STATES PATENTS

| | | | |
|---|---|---|---|
| 583,375 | 5/1897 | Hood | 49—477 X |
| 2,088,909 | 8/1937 | Jaubert | 49—477 X |
| 2,530,160 | 11/1950 | Finley | 49—477 |
| 2,830,843 | 4/1958 | Seaburg et al. | 49—141 X |

FOREIGN PATENTS

| | | |
|---|---|---|
| 499,035 | 1/1939 | Great Britain. |
| 698,226 | 10/1953 | Great Britain. |
| 366,142 | 1/1963 | Switzerland. |

DENNIS L. TAYLOR, *Primary Examiner.*

U.S. Cl. X.R.

49—477